United States Patent [19]

Tessenyi et al.

[11] Patent Number: 5,375,900
[45] Date of Patent: Dec. 27, 1994

[54] PICK-UP COVER

[75] Inventors: Kornel J. Tessenyi, The Woodlands; Martin T. Lane, Madisonville, both of Tex.

[73] Assignee: Accura Fiberglass Products, Inc., Madisonville, Tex.

[21] Appl. No.: 22,300

[22] Filed: Feb. 25, 1993

[51] Int. Cl.⁵ .................................................. B60P 7/02
[52] U.S. Cl. ...................... 296/100; 108/145; 49/246; 49/359
[58] Field of Search ............... 296/26, 100, 165, 172, 296/176; 108/145; 49/246, 358, 359

[56] References Cited

U.S. PATENT DOCUMENTS

| | | | |
|---|---|---|---|
| 1,594,514 | 8/1926 | Ainsworth | 49/358 |
| 2,032,724 | 3/1936 | Sharpe | 49/358 X |
| 2,170,014 | 8/1939 | Ellis | 49/358 X |
| 2,531,140 | 11/1950 | Linde | 108/145 |
| 3,022,108 | 2/1962 | Cooley | 49/358 X |
| 3,155,423 | 11/1964 | Cripe | 296/100 |
| 3,765,716 | 10/1973 | Van Gompel | 296/100 |
| 4,366,979 | 1/1983 | Pillot | 296/160 |
| 4,638,610 | 1/1987 | Heikkinen | 108/145 X |
| 4,856,841 | 8/1989 | Rafi-Zadeh | 296/100 |
| 5,064,240 | 11/1991 | Kuss et al. | 296/100 |

FOREIGN PATENT DOCUMENTS 259392  1/1949  Switzerland ................ 108/145

*Primary Examiner*—Dennis H. Pedder
*Attorney, Agent, or Firm*—Donald H. Fidler

[57] ABSTRACT

A cover for the open bed of a pick-up truck is movable between a horizontal closed position and a horizontal open position by linkage and a remotely activated motor where the linkage and motor are integrated with the cover. The cover locks the tailgate in a closed position and includes a tail light and domelight.

12 Claims, 3 Drawing Sheets

PICK-UP COVER

FIELD OF THE INVENTION

This invention relates to truck bed covers and more particularly to a system for selectively covering and uncovering the bed of a pick-up truck.

BACKGROUND OF THE INVENTION

Pick-up trucks are often utilized for utilization functions. However, in many instances, pick-up owners also desire to customize their vehicles with various accoutrements. One such modification is a cover to enclose the open bed of the pick-up truck.

One such top cover in the prior art is a segmented roll top cover which rolls up in a spiral at the closed end of the truck bed and is extended over the truck bed by unrolling the spirally wound cover along guide tracks. This system is unwieldy, bulky and lacks style. It rattles, leaks water and is readily subject to malfunction.

On another system, a rigid top cover is hinged to the closed end of the truck bed and is open and closed somewhat like a lid cover. It is similar to a car trunk lid mounting. This system lacks convenience and restricts the accessibility to the truck bed near the hinges; it is difficult to hold open and lacks style. Additionally the cover is a single ply which requires a domed top for strength and does not readily provide a sealing surface.

SUMMARY OF THE INVENTION

The present invention is embodied in a truck bed cover for a pick-up truck bed which is rectangular in form. The cover extends from side to side and end to end of a truck bed. The cover completely encloses the open truck bed and tailgate. On the underside of the cover is a rectangular flat surface circumferentially arranged to receive a continuous gasket strip or other sealing member which is compressed between the flat surface of the cover and the upwardly facing surfaces of the sides and ends of the truck bed to sealingly enclose the truck bed. The cover has an interior centrally located domelight and a rear tail light strip which are incorporated into the cover.

The cover is attached to the truck bed by two mechanized linkage mechanisms respectively located on each vertical side of the truck bed. The linkage mechanisms are pivotally coupled to a side or base plate member where the base plate member is attached to the vertical side of a truck bed by bolts. The linkage mechanism is positively driven or actuated by an electric motor and a screw drive to move the cover from an enclosing condition over the truck bed to an open position with the cover moving parallel and remaining parallel to the floor of the truck bed.

When the cover is in an open position, a portion of the cover overhangs the tailgate end of a truck providing shelter from sun or rain while a person is seated on the tailgate. With the tailgate up and the cover closed, the cover has an overhanging portion which overlaps the upper end of the tailgate and provides an interference lock for the tailgate in a closed position.

The cover is preferably made from thermosetting plastic with inner and outer shells for strength and for enclosing a supporting frame, if desired or necessary.

DESCRIPTION OF THE INVENTION

Figure 1:
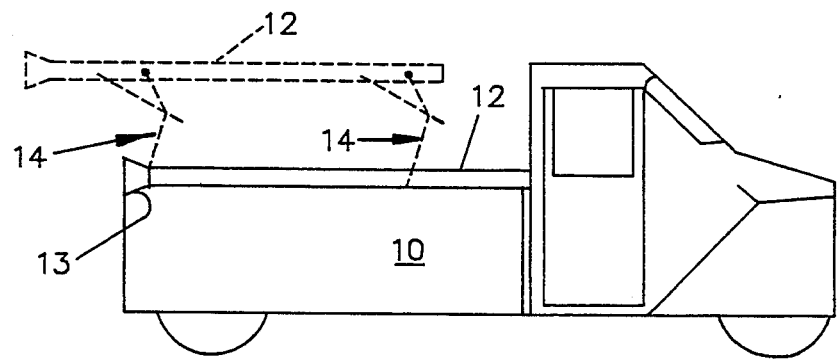
FIG. 1 is a side view of a truck with a bed cover shown in a closed and open position.
Figure 2:
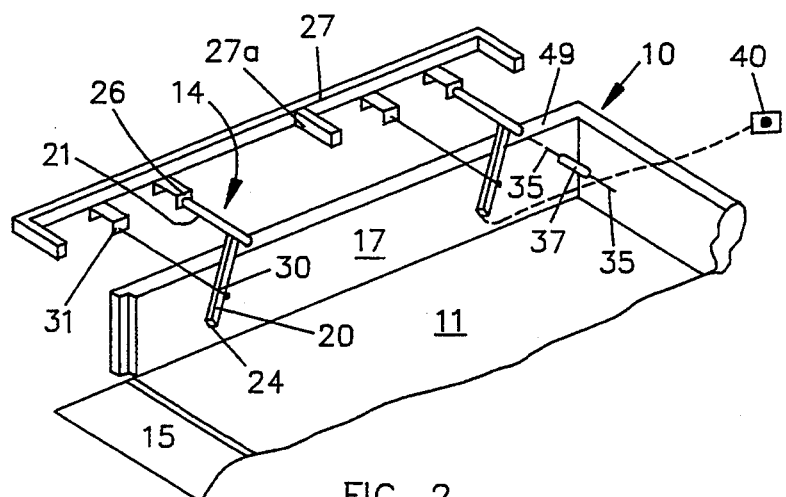
FIG. 2 is a partial perspective illustration of the linkage mechanism and attachments.
Figure 3:
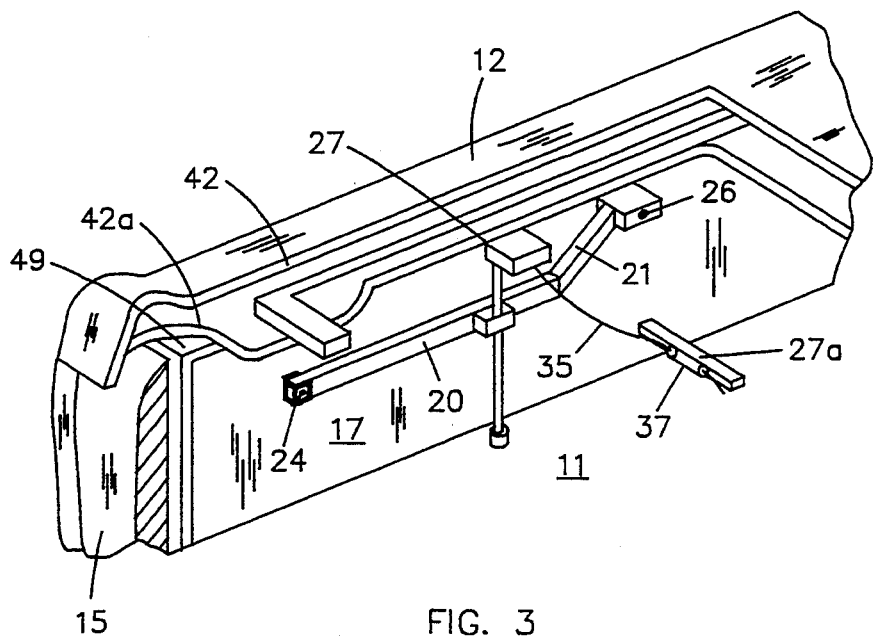
FIG. 3 is a more detailed perspective and partial illustration of the cover and linkage where a frame is enclosed in a cover.

Referring now to FIG. 1 and FIG. 2, a pick-up truck 10 has a truck bed 11. In FIG. 3 the truck bed 11 is shown as enclosed or covered by a rectangularly shaped cover member 12. The cover member 12 extends from side to side and from end to end of the truck bed. A linkage mechanism 14 is actuatable to raise the cover 12 to an open position (shown in dashed line in FIG. 1) where the cover 12 is parallel to the truck bed. The cover 12 has an end portion 13 which overhangs the upper edge of a tailgate 15 on the truck. The cover is preferably made from a thermoplastic material.

As shown in FIGS. 2 and 3, each linkage mechanism 14 on a vertical side wall of a truck bed is respectively attached to a side wall member 17. The side wall member 17, in turn, is attached by bolts to the truck frame. In some trucks, existing bolt openings in the side walls are used.

A linkage mechanism 14 includes a support arm 20 which can be constructed from rectangular aluminum bar stock. The support arm 20 at one end has an end portion 21 which is at an angle to a longitudinal axis of the support arm 20. One end of the support arm 20 is pivotally connected by a pivot means 24 to the side wall member 17 and permits rotation of the support arm 20 about the pivot 24 between a position where the support arm 20 is horizontal to the truck bed and a position where the support arm 20 is in a vertical position. The angled end portion 21 provides an offset to a pivot means 26 which connects to a frame member 27. The frame member 27 is also aluminum bar stock. The pivot means 26 can be a U shaped member fastened by a plate to the frame member 27.

The frame member 27 is only partially shown and can have any suitable arrangement to provide a structural support for the cover 12. Typically, a frame member 27 can be square shaped aluminum bar members welded into a rectangular configuration and arranged to be substantially coextensive with the edges of the cover member 12. Cross braces 27a can be utilized as necessary. The frame member 27 is pivotally attached to each of the linkage mechanisms which provide support for the cover member in an open position. Two such mechanisms on one side are shown in FIG. 2 and the mechanisms on the other side are in a mirror relationship.

To pivotally move the arm member 20 between a horizontal and a vertical position, a threaded nut 30 (SEE FIG. 3) is pivotally connected to one side of an arm member 20 about one-third of its length from the upper pivot 26. A driver mechanism 31 (SEE FIG. 5) is pivotally mounted on a side wall of the frame member 27 by pivot means 28. The driver mechanism 31 has an attached threaded rod 33 which is threaded through the pivoted nut 30. The rod 33 has an acme drive thread. The driver mechanism 31 is located on the frame 27 so that the threaded rod 33 is perpendicular to the horizontal arm member 20 when the cover member is in a closed position. The location of the driver mechanism 31, the pivot means 26, 24 and the offset from the horizontal arm are correlated to provide the parallel movement of the cover member between the closed position and the open position.

Figure 5:
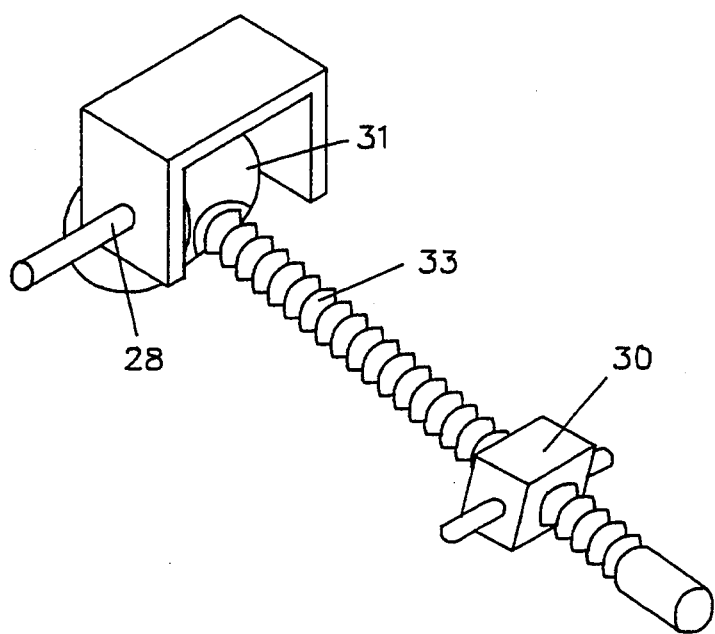
FIG. 5 is a perspective view of a portion of the linkage mechanism.

As shown in FIG. 5, the driver mechanism 31 is a right turn driver device which can be purchased from Better Products in Elkhart, Ind. and is driven by a driver cable 35. The driver cable 35, in turn, is connected to a reversible electric motor 37 (SEE FIG. 3) which can be mounted on a cross member 27a in the frame. The electric motor 37, in turn, can be controlled from the interior dash panel by a switch 40 (SEE FIG. 2). The electrical motor can be obtained from the I.T.T. Corporation.

In the foregoing description, the frame 27 can be attached to the underside of a cover. For cosmetic reasons, the frame 27 can be enclosed within a upper and lower shells 42, 42a of thermoplastic material which are bonded together (see FIG. 3). The lower shell 42a is provided with slots 45 to accommodate the driver cable where the motor 27a is enclosed between the shells.

Figure 6:
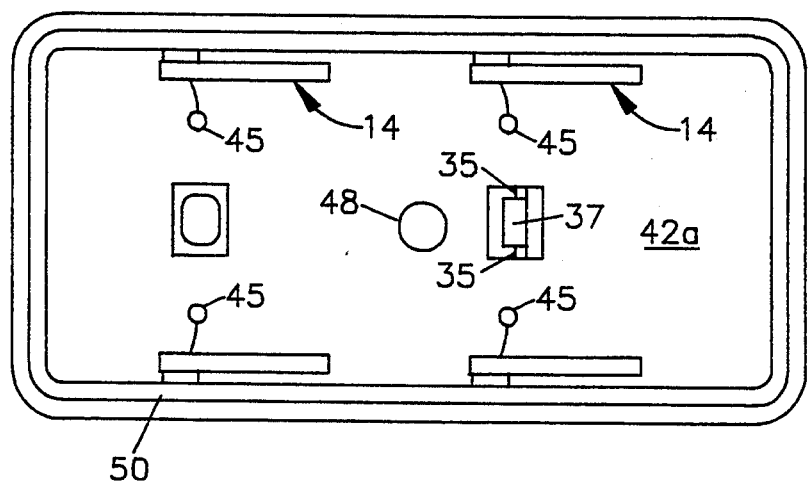
FIG. 6 is a view from the underside of a cover to illustrate the domelight and recesses for the linkage mechanism.

As shown in FIG. 6, the inside cover 42a has a domelight 48 which is electrically connected to the dash panel and can be controlled by a switch. A strip tail light 52 (SEE FIG. 4) is embedded in the end surface of the cover member 42 and can be controlled with the brake and light controls. The periphery of the cover which extends over the upper surface 49 of the truck bed has an elastomer sealing member 50 or gasket arranged so that the space between the truck bed and cover is sealed.

In a closed position of the cover, the cover has an interior lip portion 13 across its width which engages the outer surface of the tailgate 15 and locks it in position. This is important because theft of tail gates is an expensive proposition.

Figure 4:
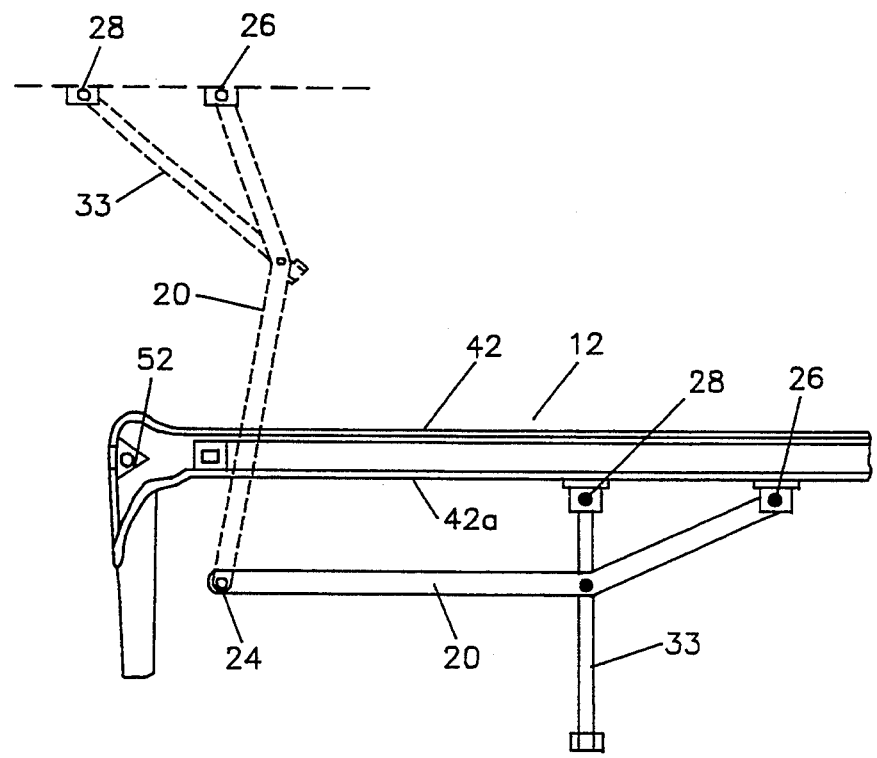
FIG. 4 is a schematic layout of the linkage mechanism.
Figure 7:
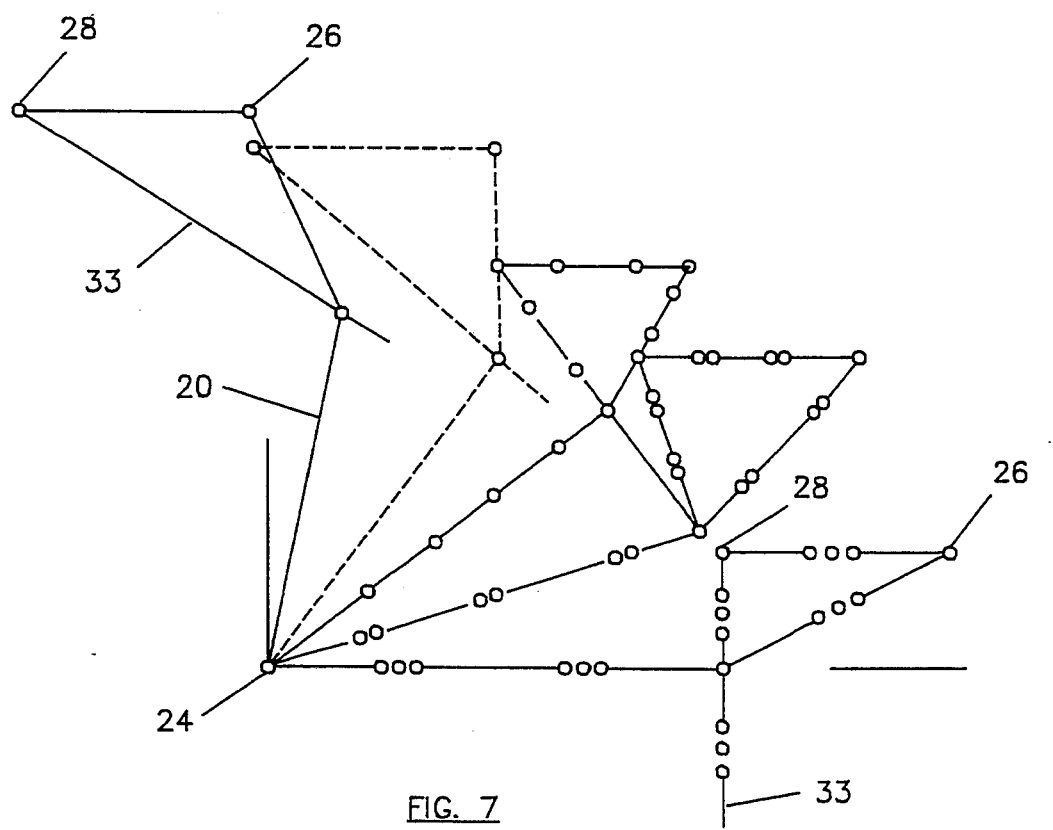
FIG. 7 is a schematic illustration of a linkage mechanism.

In the operation of the invention, the operator engages a switch 40 to activate two electrical motors 37 where each electric motor 37 drives a linkage mechanism 14 on opposite sides of the truck bed. From a closed position as shown in FIG. 4 and FIG. 7, where the rod 33 is perpendicular to the bed of the truck, the rotating threaded rod 33 in the nut 30 positively rotates the arm member 20 about the pivot 24 while maintaining the cover and pivots 28, 26 parallel to the horizontal. When the cover is fully extended, a clutch or torque slippage in the drive motor kicks in to stop the rotation of the rod 33. In the open condition of the cover, the rod 33 is at an angle of 30° relative to the plane of the cover.

It will be apparent to those skilled in the art that various changes may be made in the invention without departing from the spirit and scope thereof and therefore the invention is not limited by that which is disclosed in the drawings and specifications but only as indicated in the appended claims.

We claim:

1. A movable cover system for a truck comprising:

a truck having a truck bed defined between a horizontal floor, vertical side walls and vertical end walls;
an integral, cover member sized to extend horizontally over said truck bed;
linkage mechanism interconnecting said cover member to said truck bed including four sets of link members respectively located near the corners of the cover member, each set of link member including:
   a) a rigid support arm pivotally coupled to said cover member at one end and to one of said sidewalls at another end;
   b) a threaded rod member pivotally coupled to said cover member at one end and to said support arm at another end for moving said cover member between a closed position where said cover member extends horizontally on top said truck bed and an open position where said cover member is disposed horizontally above said truck bed; and
   c) actuating means respectively connected to said threaded rod members for rotating said rod members for moving said cover member between said open and said closed horizontal positions.

2. The system as set forth in claim 1 wherein said actuating means includes electric motor means for rotating said threaded rod members.

3. The system as set forth in claim 1 wherein said threaded rod members are connected to said cover member and said link member so as to be perpendicular to a plane of said cover member when tile cover member is in a closed position and to be at a 30° angle relative to said plane when said cover member is in an open position.

4. The system as set forth in claim 1 wherein one of said end walls is a pivotal tailgate for said truck bed and is arranged to pivot between an open condition parallel to the floor of the truck bed and a closed condition perpendicular to the floor of the truck bed and means on the underside of said cover member for engaging said tailgate in a locking condition when said tailgate and said cover member are in a closed position.

5. The system as set forth in claim 1 wherein the cover member is comprised of an upper and lower elements constructed of thermoplastic material and where the lower element is constructed and arranged to reinforce the upper element and wherein the upper element has an outer flat surface.

6. The system as set forth in claim 5 wherein the cover member has sealing means arranged for sealing said cover member relative to said side and said end walls.

7. A vertically moveable cover for a bed of a pick-up truck comprising;

an integral cover member sized to extend horizontally over a bed of a pick-up truck from side to side and from end to end of the bed;
said bed having inner side walls;
two spaced apart linkage mechanism means respectively attachable to each of said inner side walls of the bed for movably connecting said cover member to the side walls, said linkage mechanism means respectively having rigid linking members with pivoted connections to said cover member and to a side wall for controlling movement of said cover member between a closed position on bed and a horizontal open position located above the bed; and actuating means for said linkage mechanism, said actuating means respectively including a threaded driver member interconnecting said cover member and one of said linking members for positively moving said cover member between said closed position and said horizontal open position, said threaded driver member acting to positively retain said cover member in each of said positions.

8. The cover as set forth in claim 7 and further including sealing means about the periphery of the underside of the cover member for sealing the cover member with respect to the bed in a closed position of the cover member.

9. The cover as set forth in claim 7 wherein said threaded driver member is pivotally connected at one end to said cover member and is threadedly received in a pivotally mounted nut on one of said linking members.

10. The cover as set forth in claim 9 wherein said actuating means includes an electric motor means for rotating said threaded driver member.

11. The cover as set forth in claim 7 wherein said threaded driver member is located so as to be perpendicular to a plane of said cover member when said cover member is in a closed position.

12. The cover as set forth in claim 7 wherein one of said ends of the bed is a pivotal tailgate which is arranged to pivot with respect to a floor of said bed between an open condition parallel to floor of the bed and closed condition perpendicular to the floor of the bed and;

means on an underside of said cover member for engaging with said tailgate for locking said cover member in a closed position when said cover member and said tailgate are in a closed position.

* * * * *